United States Patent [19]
Maus

[11] Patent Number: 5,655,211
[45] Date of Patent: Aug. 5, 1997

[54] ELECTRICALLY CONDUCTIVE HONEYCOMB STRUCTURE, PARTICULARLY FOR ELECTRICALLY HEATABLE CATALYTIC CONVERTERS FOR MOTOR VEHICLES AND METHOD FOR PRODUCING A HONEYCOMB BODY

[75] Inventor: Wolfgang Maus, Bergisch Gladbach, Germany

[73] Assignee: Emitec Gesellschaft fuer Emissionstechnologie, Lohmar, Germany

[21] Appl. No.: 714,723

[22] Filed: Sep. 17, 1996

Related U.S. Application Data

[63] Continuation of Ser. No. 328,076, filed as PCT/EP93/00640, Mar. 18, 1993, abandoned.

[30] Foreign Application Priority Data

Apr. 22, 1992 [DE] Germany .................. 42 13 261.4

[51] Int. Cl.⁶ .................................................. B22F 7/00
[52] U.S. Cl. .................... 428/548; 428/552; 219/552; 219/553; 219/541
[58] Field of Search ................................ 219/552, 541, 219/553; 428/546, 548, 550, 551, 552

[56] References Cited

U.S. PATENT DOCUMENTS

| | | | |
|---|---|---|---|
| 3,956,614 | 5/1976 | Hervert | 219/541 |
| 3,982,100 | 9/1976 | Hervert | 219/553 |
| 4,717,813 | 1/1988 | Berg et al. | 219/541 |
| 5,202,547 | 4/1993 | Abe et al. | |
| 5,446,264 | 8/1995 | Kondo et al. | |

FOREIGN PATENT DOCUMENTS

| | | |
|---|---|---|
| 0452125 | 10/1991 | European Pat. Off. . |
| 0502731 | 9/1992 | European Pat. Off. . |
| 641679 | 1/1937 | Germany . |
| 3004131 | 1/1991 | Germany . |
| 88910470 | 11/1989 | WIPO . |
| 8910471 | 11/1989 | WIPO . |

*Primary Examiner*—Charles T. Jordan
*Assistant Examiner*—Anthony R. Chi
*Attorney, Agent, or Firm*—Herbert L. Lerner; Laurence A. Greenberg

[57] ABSTRACT

A honeycomb structure includes a honeycomb body of electrically conductive material. The honeycomb body has regions of different material with different specific electrical resistance. The honeycomb body is electrically divided by slots and/or electrically insulating layers for causing an electric current to flow along a winding path through the honeycomb body. A method for producing a honeycomb body having regions of different specific electrical resistances includes supplying two different compositions of metal powder or a mixture of metal and ceramic powder to an extruder, while guiding one of the compositions to an inner region and the other of the compositions to an outer region of the extruder surrounding the inner region. The different compositions are co-extruded to make a monolithic honeycomb body. The honeycomb body is fired, sintered or physically-chemically treating differently from one region to another. Offset slots are formed in the extruded honeycomb body.

9 Claims, 2 Drawing Sheets

ELECTRICALLY CONDUCTIVE HONEYCOMB STRUCTURE, PARTICULARLY FOR ELECTRICALLY HEATABLE CATALYTIC CONVERTERS FOR MOTOR VEHICLES AND METHOD FOR PRODUCING A HONEYCOMB BODY

CROSS-REFERENCE TO RELATED APPLICATION

This application is a continuation of application Ser. No. 08/328,076, filed on Oct. 24, 1994 now abandoned, which is a continuation of International Application Serial No. PCT/EP93/00640, filed Mar. 18, 1993.

BACKGROUND OF THE INVENTION

1. Field of the Invention

The invention relates to a honeycomb structure having a honeycomb body of electrically conductive material being electrically divided by slots and/or electrically insulating layers in such a way that an electric current can flow along a winding path through the body.

Such bodies are known from Published International Application WO 89/10470, corresponding to U.S. Pat. No. 5,146,743; Published International Application WO 89/10471, corresponding to U.S. Pat. No. 5,322,672 and to co-pending U.S. application Ser. No. 08/051,348, filed Apr. 27, 1993; or Published European Application No. 0 452 125 A2, corresponding to U.S. Pat. No. 5,063,029, for instance.

In Published European Application No. 0 452 125 A2, corresponding to U.S. Pat. No. 5,063,029, which is the point of departure of the present invention, many different possibilities for dividing a honeycomb body by means of slots are described. However, it has been demonstrated that an electrical current which is compelled to take a meandering path always has a tendency to find the shortest path, in other words the path with the least electrical resistance. A substantial proportion of the current therefore flows within a very small region near the slots or layers that limit the electrical conductivity. Typically, a honeycomb body of the above-described construction through which current flows in a meandering path will not be heated uniformly but instead has especially hot spots on the insides of the curves in the current path. That may even lead to red-hot heating or melting or at least to softening of the body, which impairs its stability and service life. Particularly when such a honeycomb body is used as an electrically heatable catalytic converter in a motor vehicle, that is of decisive significance, because high strains occur there and only limited electrical energy is available, which must be made use of as optimally as possible.

Published European Application No. 0 452 125 A2, corresponding to U.S. Pat. No. 5,063,029, mentions various possibilities with which the electrical resistance in different portions of the body should be varied. Those include varied wall thicknesses of the individual honeycombs, a different number of honeycombs per unit of cross-sectional area, or a different axial length of individual cell walls. However, in principle such provisions are not suited to attaining a more homogeneous distribution of the current in an electrically conductive honeycomb body. The reason for that is that the specific electrical resistance of the material always remains the same, so that by providing more or less material, the resistance in that region can be varied, but not the specific current density per unit of material present. For instance, if the wall thickness is increased in a region in which especially strong currents flow, then the resistance decreases there and even stronger currents flow, so that the thicker material becomes heated up just as much as thinner material. Conversely, if the wall thickness or the number of cells is decreased, then while a lesser current flows, nevertheless it heats the lesser quantity of existing material just as strongly as before. The same is logically true for axially variable lengths of the cell walls as well.

SUMMARY OF THE INVENTION

It is accordingly an object of the invention to provide an electrically conductive honeycomb structure, particularly for electrically heatable catalytic converters for motor vehicles and a method for producing a honeycomb body, which overcome the hereinafore-mentioned disadvantages of the heretofore-known devices of this general type and in which the body can be acted upon more uniformly over its entire cross-sectional area with an electric current.

With the foregoing and other objects in view there is provided, in accordance with the invention, a honeycomb structure, comprising a honeycomb body of electrically conductive material; the honeycomb body having regions of different material with different specific electrical resistance; and the honeycomb body being electrically divided by means, such as slots and/or electrically insulating layers, for causing an electric current to flow along a winding path through the honeycomb body.

The essence of the present invention is that for a specified cell geometry, which need not necessarily be homogeneous, the current distribution in this specified cell geometry is attained by varying the specific electrical resistance, without essentially changing the mass in the various regions present because of the specified cell geometry. In this way, the current density in the regions with higher specific resistance can be decreased, causing some of the current flow to be displaced to other regions, and at the same time in the region with higher specific resistance, excessive heating of the material no longer occurs, since the mass to be heated up there need not simultaneously be decreased.

In accordance with another feature of the invention, in an especially simple way, regions with different specific resistance can be produced in extruded honeycomb bodies of metal powder or a mixture of metal and ceramic powder.

Through the use of a different makeup of the powdered material in different regions of the honeycomb body, the specific resistance can be adjusted within wide limits. For instance, the specific resistance can be decreased by reducing the proportion of metal powder in a metal and ceramic powder mixture. The electrical resistance in some regions can also be increased by means of variously strong oxidation and other physical-chemical processes.

In accordance with a further feature of the invention, the honeycomb body is a carrier body for catalytically active material, and in particular for an electrically heatable catalytic converter for a motor vehicle. Precisely with such honeycomb bodies, critical factors are homogeneous heating, in order to utilize the available electrical energy economically, as well as stability and a long service life under difficult operating conditions.

In accordance with an added feature of the invention, the honeycomb body is divided by a plurality of slots, which are approximately parallel but offset from one another, in such a way that an electric current can flow in an approximately meandering fashion through the body.

In accordance with an additional feature of the invention, the slots generally have ends in the interior of the honeycomb body. If the honeycomb body, at least in the region of the ends of the slots, is formed of a material having a higher specific electrical resistance than in the other regions, then some of the electrical current is displaced out of this region, and overheating there is averted. It is not absolutely necessary for the regions having a higher specific resistance to cohere and form a single large region, but that will generally be advantageous from the production standpoint. The precise shape of such a region of higher specific resistance is not critical, as long as the resistance is increased enough in the vicinity of the ends of the slots.

In accordance with yet another feature of the invention, for technical production reasons, particularly with extruded honeycomb bodies, the invention is especially readily applicable to a cylindrical or oval-cylindrical honeycomb body with approximately axially extending slots, wherein the slots are each offset approximately parallel to a radius and extend from the outside as far as their end in the interior of the honeycomb body. The honeycomb body, in its inner cross-sectional region, which includes at least all of the ends of the slots, is formed of a material having a higher specific electrical resistance than in its outer cross-sectional region. As will be explained in further detail in conjunction with the drawing, a honeycomb body of this kind can easily be produced by extrusion.

In accordance with yet a further feature of the invention, the total resistance of the honeycomb body is in the range from approximately 0.01 to approximately 1 Ohm, which is the typical range for heatable catalytic converters in motor vehicles, particularly with electrical systems that have a voltage of 12 to 24 V.

In accordance with yet an added feature of the invention, although the specific electrical resistance, for instance in extruded honeycomb bodies, can be varied within wide limits, it is nevertheless advantageous for the higher specific electrical resistance to be approximately twice as high as the specific electrical resistance in the regions of low specific electrical resistance. In principle, naturally more than two different regions with different specific electrical resistance, or a continuous variation of the specific electrical resistance, may be present in a honeycomb body.

With the objects of the invention in view, there is also provided a method for producing a honeycomb body having regions of different specific electrical resistances, which comprises supplying two different compositions having different specific electrical resistances and being selected from the group consisting of metal powder and a mixture of metal and ceramic powder to an extruder, while guiding one of the compositions to an inner region of the extruder and guiding the other of the compositions to an outer region of the extruder surrounding the inner region; co-extruding the different compositions to make a monolithic honeycomb body; firing or sintering or optionally physically-chemically treating the extruded honeycomb body differently from one region to another; and forming offset slots in the extruded honeycomb body for causing an electric current to flow along a winding path through the honeycomb body.

The order of these steps may also differ. For instance, the honeycomb body may already be provided with slots upon extrusion or directly thereafter, before the other steps are performed. More than two different compositions may also be used, which then produce intermingled regions with specific electrical resistance. The term "different compositions" should not necessarily be understood to mean that the compositions must have a substantially different material makeup or powder size. Under some circumstances it may also suffice if an additive is admixed with some of the composition, which additive in the later physical-chemical treatment brings about more pronounced oxidation, for instance, whereby the specific resistance is decreased. In general, however, the different specific resistance will be achievable by means of different proportions of ceramic composition in the powder mixture.

Other features which are considered as characteristic for the invention are set forth in the appended claims.

Although the invention is illustrated and described herein as embodied in an electrically conductive honeycomb structure, particularly for electrically heatable catalytic converters for motor vehicles and a method for producing a honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
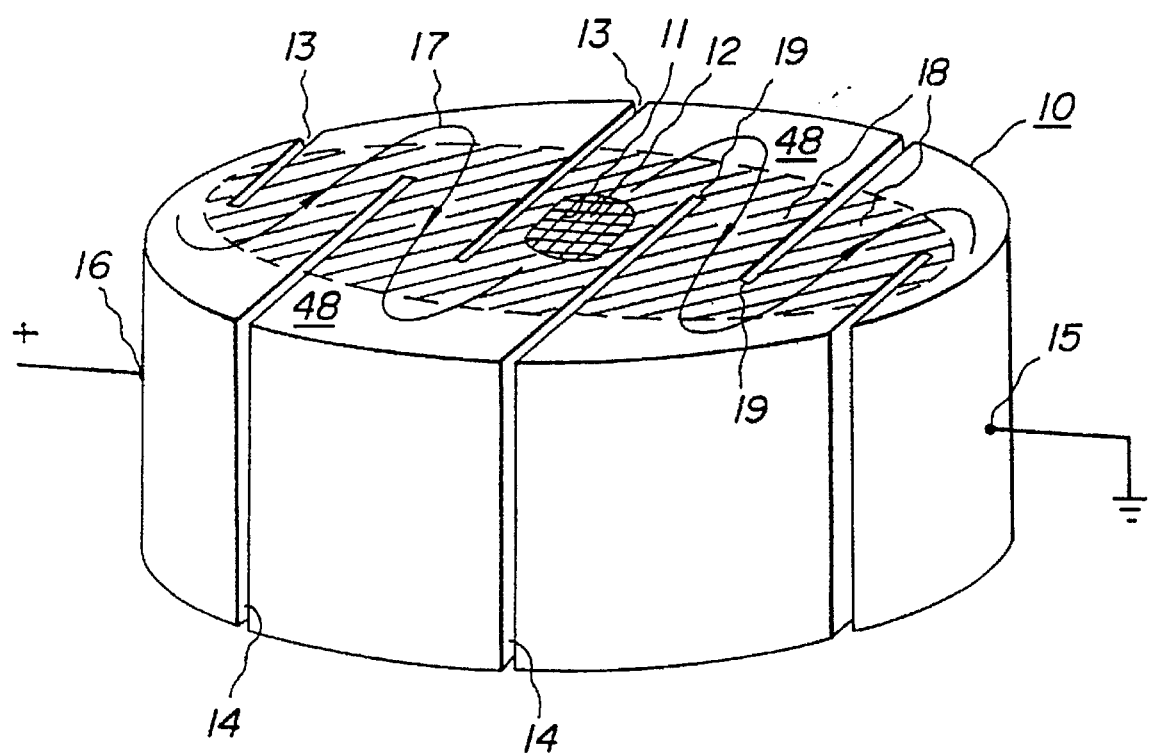
FIG. 1 is a diagrammatic, front-perspective view of a honeycomb body according to the invention.

Referring now to the figures of the drawing in detail and first, particularly, to FIG. 1 thereof, there is seen a honeycomb structure having a honeycomb body 10, which includes a number of thin walls 11 that form numerous channels 12, through which a fluid can flow in the axial direction. Through the use of slots 13, 14, the honeycomb body 10 is electrically divided in such a way that an electric current which is applied to terminals 15, 16 flows in meandering fashion through the honeycomb body 10, as is indicated by a wavy line 17. Reference numerals 13, 14 may also represent insulating material inserted into the honeycomb body. A region 18 of higher specific electrical resistance is present in the interior of the honeycomb body and in particular surrounds ends 19 of the slots 13, 14. An outer cross-sectional region 48 has a lower specific electrical resistance. In this way, the electric current 17, which would normally flow past the ends 19 as close as possible to them, is displaced farther outward from them, and as a result overheating can be averted and a uniform current distribution can be attained.

Figure 2:
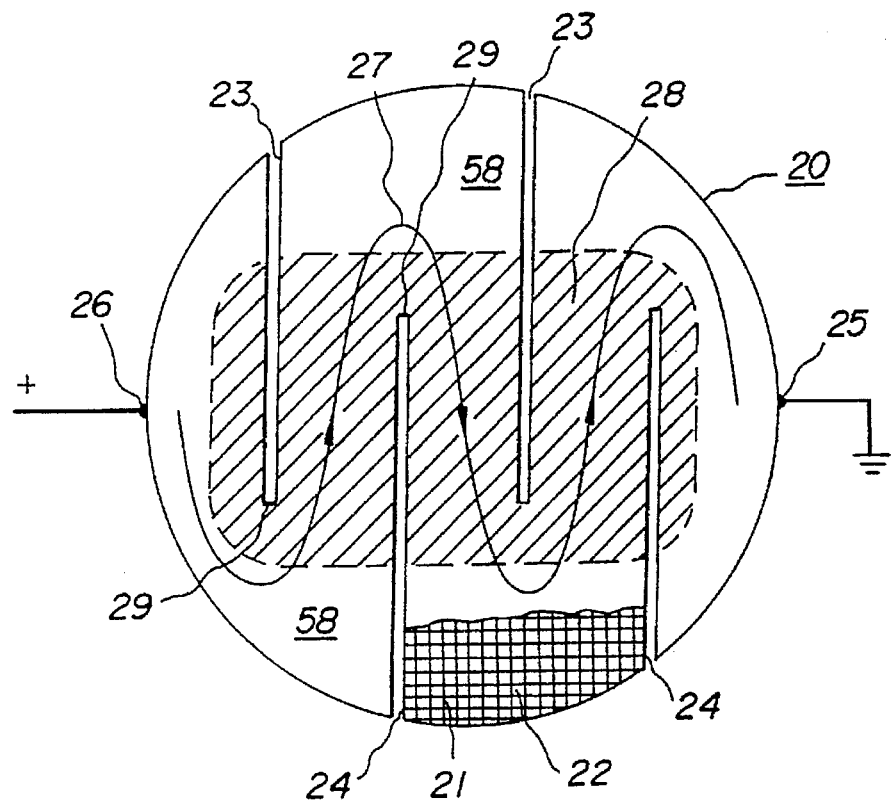
FIG. 2 is a cross-sectional view of a honeycomb body according to the invention.

FIG. 2 is a cross section which diagrammatically shows the outcome of the present invention for a round honeycomb body 20. The honeycomb body 20 again includes a number of channels 22 which are defined by walls 21. Slots 23, 24 divide the honeycomb body electrically, so that when a voltage is applied to terminals 25, 26, a current 27 flows through the honeycomb body in meandering fashion. Reference numerals 23, 24 may also represent insulating material inserted into the honeycomb body. A region 28 of higher electrical resistance surrounds ends 29 of the slots 23, 24, so that the electric current 27 is displaced outward from these ends 29. An outer cross-sectional region 58 has a lower specific electrical resistance. When this effect is utilized, under some circumstances the slots 23, 24 may be shorter than if there were no region 28 of increased specific resistance, which is advantageous for the sake of stability of the overall body.

Figure 3:
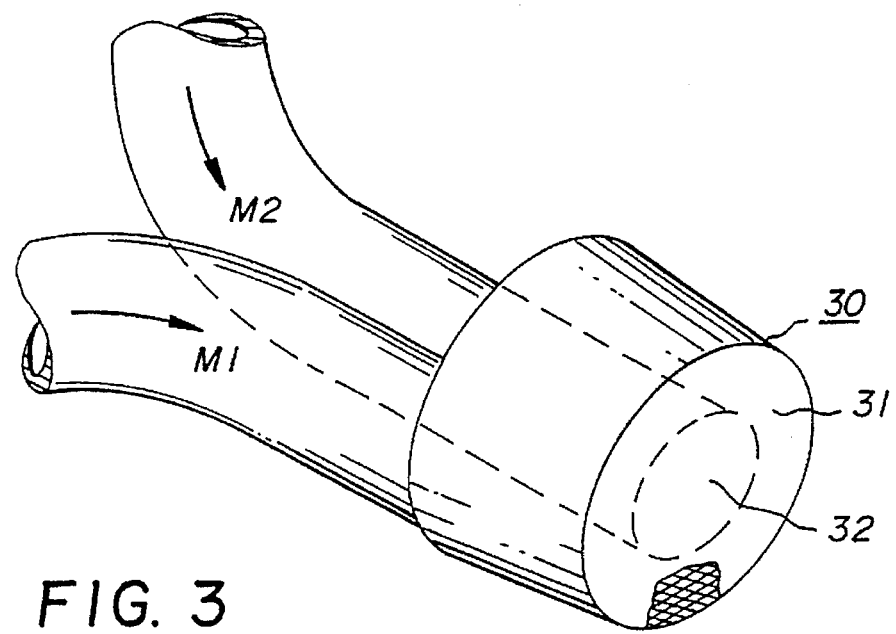
FIG. 3 is a fragmentary, perspective view illustrating a procedure for producing an extruded honeycomb body according to the invention.

FIG. 3 diagrammatically shows the process upon extrusion of a honeycomb body according to the invention. Two different powdered compositions M1, M2 are supplied to an extruder 30. Specifically the composition M1 having a lower specific electrical resistance is supplied to an outer region 31, and a composition M2 with a higher specific electrical resistance is supplied to an inner region 32. Naturally, the electrical resistance of the compositions does not in fact play the decisive role in the extrusion. It is the later-produced electrical resistance after sintering or another kind of treatment that plays the decisive role.

The present invention makes it possible to produce electrically heatable honeycomb bodies, especially for catalytic converters in motor vehicles, that have a largely homogeneous current distribution in which hot spots in their interior are largely avoided. This increases stability and service life even in the face of major mechanical demands of the kind made in motor vehicles.

I claim:

1. A honeycomb structure, comprising:

a honeycomb body of electrically conductive material;

said honeycomb body having a plurality of mutually parallel and mutually offset slots formed therein, for electrically dividing said honeycomb body and for causing an electric current to flow along a meandering path through said honeycomb body;

said honeycomb body having an interior, said slots having ends in said interior;

said honeycomb body having regions of different electrically conductive material with different specific electrical resistance, said regions including at least one region at said ends of said slots and at least one other region;

wherein said at least one region at said ends of said slots is formed of a material having a higher specific electrical resistance than said at least one other region.

2. The honeycomb structure according to claim 1, wherein said honeycomb body is an extruded body of metal powder or of a mixture of metal and ceramic powder.

3. The honeycomb structure according to claim 1, wherein said honeycomb body is an extruded body of a mixture of metal and ceramic powder.

4. The honeycomb structure according to claim 1, wherein said honeycomb body is a carrier body for catalytically active material.

5. The honeycomb structure according to claim 1, wherein said honeycomb body is a carrier body for an electrically heatable catalytic converter for a motor vehicle.

6. The honeycomb structure according to claim 1, wherein said honeycomb body is cylindrical or oval-cylindrical and has an interior, said slots extend axially, are each offset approximately parallel to a respective radius and extend from outside said honeycomb body up to an end in said interior, said regions include an outer cross-sectional region and an inner cross-sectional region including at least all of said ends of said slots, and said inner cross-sectional region is formed of a material having a higher specific electrical resistance than said outer cross-sectional region.

7. The honeycomb structure according to claim 1, wherein said honeycomb body has an electrical total resistance of 0.01 to 1 Ohm.

8. The honeycomb structure according to claim 1, wherein said region having the higher specific electrical resistance has a specific electrical resistance at least twice as high as the region having the lower specific electrical resistance.

9. The honeycomb structure according to claim 6, wherein said region having the higher specific electrical resistance has a specific electrical resistance at least twice as high as the region having the lower specific electrical resistance.

* * * * *